(No Model.)
E. H. COTTRELL.
BRAKE FOR DRIVING SHAFTS.
No. 362,250. Patented May 3, 1887.
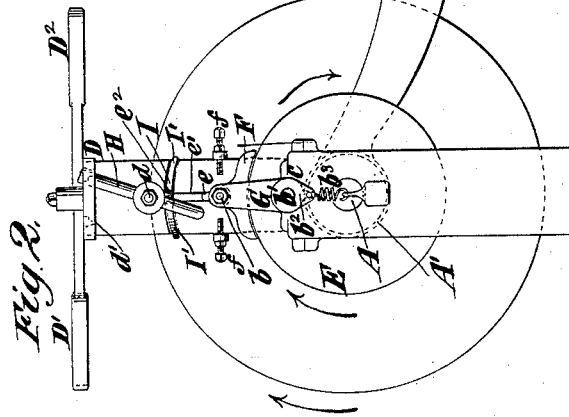
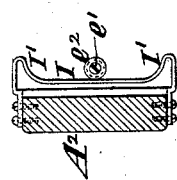
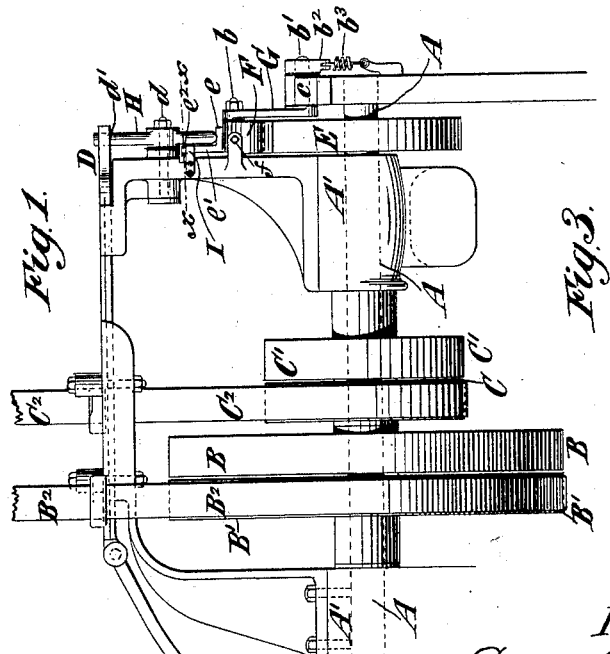
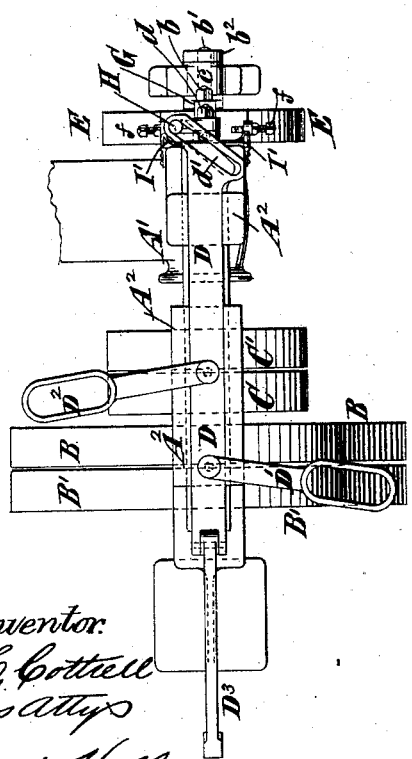
Witnesses
Emil Hertu
C. Sundgren
Inventor:
Edgar H. Cottrell
by his Attys
Brown & Hall

UNITED STATES PATENT OFFICE.

EDGAR H. COTTRELL, OF STONINGTON, CONNECTICUT.

BRAKE FOR DRIVING-SHAFTS.

SPECIFICATION forming part of Letters Patent No. 362,250, dated May 3, 1887.

Application filed June 9, 1886. Serial No. 204,596. (No model.)

*To all whom it may concern:*

Be it known that I, EDGAR H. COTTRELL, of Stonington, in the county of New London and State of Connecticut, have invented a new and useful Improvement in Brakes for the Driving-Shafts of Metal-Planers and other Machines, of which the following is a specification.

My invention relates to machines in which the driving belt or belts are shifted at short periods from fast to loose pulleys, and vice versa, in order to stop the driving-shaft of the machine or to change its direction of rotation, as is necessary in order to produce the direct and return movements of the bed in a metal-planer. The momentum which the pulleys and revolving parts of such a machine acquire while rotating in one direction carries the shaft forward for some distance after the belt is shifted, and not only produces a material loss of time in operating the machine, but also produces slip and strain in the driving belt or belts.

The object of my invention is to provide a friction-brake for the driving-shaft which will be applied automatically when the belt or belts is or are shifted in order to stop the shaft, and particularly to provide a brake in which a brake-shoe and brake-drum are so combined with each other and with the belt-shipper or belt-shipping bar of the machine that when the belt-shipper is moved to ship the belt or belts the brake-shoe will be tripped or moved from an inoperative position into frictional contact with the brake-drum, and will thereupon be drawn tightly against the drum by the slightly-continued rotation of the drum.

The invention consists in novel combinations of parts, which are hereinafter described, and pointed out in the claims, and by which the desired result is accomplished.

In the accompanying drawings, Figure 1 is a side elevation of a portion of a driving-shaft with pairs of fast and loose pulleys of different sizes and belts for rotating it in opposite directions, also including the belt-shippers and a brake mechanism embodying my invention. Fig. 2 is an end elevation looking from the right hand of Fig. 1. Fig. 3 is a plan; and Fig. 4 is a sectional view upon the plane of the dotted line $x\,x$, Fig. 1, and upon a larger scale.

Similar letters of reference designate corresponding parts in all the figures.

A designates a portion of the driving-shaft for operating a machine—such, for example, as a metal-planer.

B B' designate, respectively, fast and loose pulleys, which receive a driving-belt, $B^2$, for rotating the shaft A, to produce the direct or operative movement of the planer-bed; and C C' designate, respectively, fast and loose pulleys receiving a belt, $C^2$, through which the shaft A is operated to produce the quicker return movement of the bed. The shaft A is fitted to bearings A', and by the action of the belts and pulleys is rotated alternately in reverse directions.

D designates a shipping-bar provided with belt-shippers D' $D^2$, which respectively operate to shift the belts $B^2\,C^2$, and this shipper-bar D may be operated by a rod-connection, $D^3$, as is usual in metal-planers, the shipper-bar being shifted as the bed terminates its movement in each direction. The bar D may be fitted to slide in a direction parallel with the shaft A in guides or bearings $A^2$.

Upon the outer end of the shaft is secured a brake drum or wheel, E, here shown as having a cylindric periphery, and operating in connection with the brake-drum E is a brake-shoe, F, which is supported above the drum by an arm, G. The brake-shoe F is pivotally connected at $b$ with the arm G, and said arm is fulcrumed or pivoted at $b'$ above the shaft A, the length of the arm being considerably less than the radius of the brake-drum E. Consequently it will be seen that although the arm when in a vertical position, as shown in Fig. 2, holds the brake-shoe F just clear of the periphery of the brake-wheel, it will, when swung in either direction from such central position, draw the brake-shoe F into frictional contact with the brake-drum E, and that if the drum be rotated in one or other direction it will by frictional engagement with the face of the brake-shoe tighten the shoe upon the drum and stop the drum and shaft A almost instantly.

In the drawings I have represented the belt $C^2$ as upon the tight pulley C, and as rotating said pulley and the shaft A and brake-drum E in the direction indicated by the arrows, Fig. 2.

The pivot $b'$ of the arm G is a short rock-shaft supported in a bearing, $c$, and having upon its outer end a shorter arm, $b^2$, with which is connected a spring, $b^3$, as clearly shown in Figs. 1 and 2. From this description it will be seen that the spring $b^3$ always acts automatically to hold the arm G in a vertical position with the brake-shoe F, just clear of the brake-drum E, and as soon as the action which swings the arm G from such central position and applies the brake-shoe F ceases the spring $b^3$ at once returns the arm and brake shoe to the position shown in Fig. 2.

H designates a brake-trip, which, as here represented, consists of a lever pivoted at $d$, and the lower end of which is adapted to engage with the toe $e$ of the brake-shoe F, while the upper end of said trip-lever engages a cam-slot, $d'$, which is formed in the shipper-bar D, and the length of which is oblique to the line of said bar, as is best shown in Fig. 3. When the brake-shoe F and arm G are in the position shown, the lower end of the trip-lever H, if the latter be swung by the movement of the bar D, will act upon the toe $e$ of the brake-shoe, and will move the brake-shoe and arm G sufficiently from the central position shown to bring the brake-shoe in frictional contact with the drum E, and the lever H will then pass beyond the toe $e$, while the shoe F will be tightened upon the brake-drum by the further rotation of the latter.

For example, suppose that the bar D be shifted in a direction to move the belt $C^2$ from the fast pulley C to the loose pulley C' and the belt $B^2$ from the loose pulley B' to the fast pulley B. Such movement of the bar D will, by the action of the cam $d'$, shift the trip-lever H, and, by bringing its lower end in contact with the toe $e$ of the brake-shoe, will move said shoe to the right of Fig. 2 and bring it in frictional contact with the brake-drum E. The rotation of the drum E in the direction of the arrow will, by frictional engagement with the face of the shoe, instantly swing the shoe and arm G still farther to the right and bind the shoe tightly against the brake-drum E, so as to immediately stop said drum and the shaft to which it is secured. The drum being stopped, the belt $B^2$ acts at once to turn it in the opposite direction, and as soon as the reverse rotation commences the shoe F is instantly released from the drum, and the spring $b^3$ at once returns the shoe and arm G to the central position shown.

I have shown at opposite sides of the arm G adjusting-screws $j$, which form stops for limiting the movement of the arm G and the shoe F in opposite directions, and I have also represented the shoe F as provided with an upwardly-extending arm, $e'$, having upon it a roller, $e^2$, bearing against a spring, I, which is fixed, as shown in Fig. 4, to one of the brackets supporting a guide, $A^2$, for the shipper-bar D. This spring I has outwardly-curved portions I', against which the roller $e^2$ is brought at opposite ends of its movement, and these curved portions of the spring I exert a powerful influence to move the brake-shoe F and arm G, so as to slightly loosen the hold of the shoe upon the brake-wheel E the instant that the rotation of the latter is stopped.

It will be observed that according to my invention the brake-shoe F is tightened upon the drum E by the very rotation of the drum as soon as the shoe is brought in contact therewith. Hence the labor of applying the brake is solely performed by the rotary brake-drum E, and the only labor which is performed by the shipper-bar D is simply to trip the brake-shoe F and bring it in contact with the drum without pressing it forcibly against the drum. In this respect my invention is distinguished from other arrangements of brakes wherein the brake-shoe has been forced against the brake-drum by power from an outside source and independent of the rotation of the drum.

What I claim as my invention, and desire to secure by Letters Patent, is—

1. The combination, with the driving-shaft and pulleys for the reception of a shifting belt to drive said shaft, of a brake-drum, a belt-shipper, a brake-shoe, and a connection whereby the brake-shoe is brought into contact with the drum simultaneously with the movement of the belt-shipper, and whereby the brake-shoe is caused to act upon the drum with increasing pressure due to frictional engagement of the drum with it, substantially as herein described.

2. The combination, with a driving-shaft and pulleys for the reception of a shifting belt to drive said shaft and the brake-drum, of a belt-shipper, a brake-shoe, and a connection which is operated by the movement of the belt-shipper to bring the shoe in contact with the drum, and by which the brake-shoe is caused to act upon the drum with increasing pressure due to the frictional engagement of the drum with it, substantially as herein described.

3. The combination, with a driving-shaft and pulleys thereon for the reception of a shifting belt to drive said shaft, of a brake-drum on the shaft, a brake-shoe, and a supporting-arm therefor less in length than the radius of said drum and pivoted eccentrically to the shaft, a belt-shipper, and a brake-trip actuated thereby, and by which said supporting-arm will be moved to bring the brake-shoe in frictional contact with the brake-drum, whereupon the rotation of the drum will, by frictional engagement with the shoe, cause the latter to tighten its hold upon the drum, substantially as herein described.

4. The combination, with a driving-shaft and pairs of fast and loose pulleys of different diameters for the reception of shifting belts to drive said shaft in reverse directions, of a brake-drum on the shaft, a brake-shoe and a supporting-arm therefor less in length than the radius of said drum and pivoted eccentrically to the shaft, a belt-shipper, and a brake-trip actuated thereby to bring the brake-shoe in frictional contact with the brake-drum, whereupon the rotation of the drum will, by frictional engagement with the shoe, cause the latter to tighten its hold upon the drum, substantially as herein described.

5. The combination, with a driving-shaft, A, and pulleys for receiving a shifting belt to drive the shaft, of the brake-drum E, the brake-shoe F and its supporting-arm G, a spring for returning said arm and shoe to an inoperative position, a belt-shipper, and a brake-trip actuated thereby to move the brake-shoe from its central and inoperative position into frictional contact with the drum, whereupon the drum will, by its rotation, tighten the shoe upon the drum and stop the drum and shaft, substantially as herein described.

6. The combination, with the shaft A and pulleys for a shifting belt to drive the shaft, of the brake-drum E, the shoe F, provided with the arm $e'$ and the shoe-supporting arm G, the spring $b^3$, for returning the shoe and arm to an inoperative position, the spring I, on which the said arm of the shoe bears, and which serves to start the shoe in its return movement, a belt-shipper, and a brake-trip actuated thereby to move the shoe from its inoperative position into frictional contact with the drum, whereupon the drum, by its rotation, will tighten the shoe upon the drum, substantially as herein described.

7. The combination, with the shaft A and pulleys for a shifting driving-belt, of a brake-drum on the shaft, a brake-shoe arranged to be tightened by the rotation of the drum when moved into frictional contact therewith, a spring for returning the shoe to an inoperative position, the trip-lever H, for moving the shoe into frictional contact with the drum, and the sliding shipper-bar provided with a cam extending obliquely to its line of movement for operating the trip-lever to shift the brake-shoe, substantially as herein described.

E. H. COTTRELL.

Witnesses:
C. HALL,
FREDK. HAYNES.